June 15, 1971   A. B. BRITT   3,585,093
METHOD AND APPARATUS FOR APPLYING METAL FOIL
Filed Nov. 9, 1967
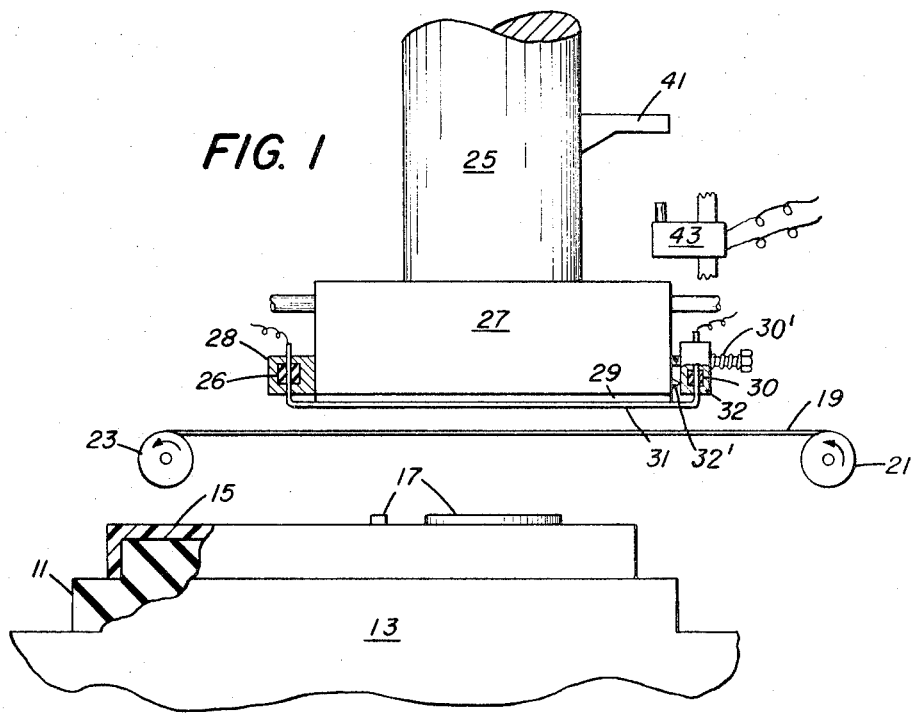
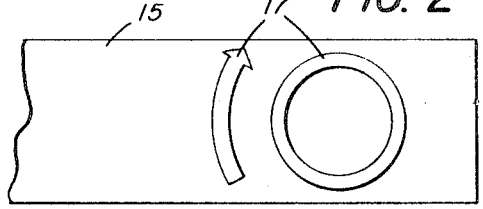
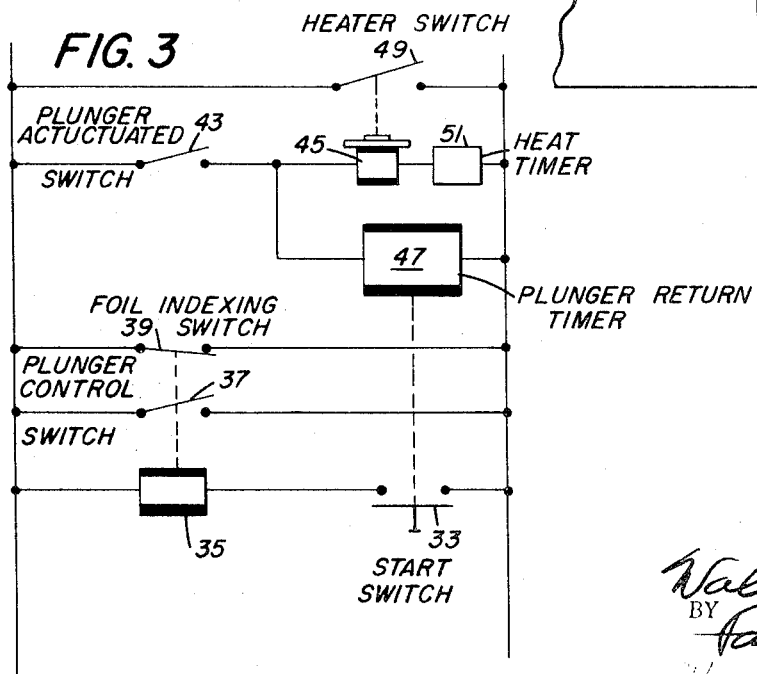
ANDREW B. BRITT
INVENTOR.
ATTORNEYS United States Patent Office 3,585,093
Patented June 15, 1971

3,585,093
METHOD AND APPARATUS FOR APPLYING METAL FOIL
Andrew B. Britt, Penfield, N.Y., assignor to Eastman Kodak Company, Rochester, N.Y.
Filed Nov. 9, 1967, Ser. No. 681,675
Int. Cl. B44c 1/24
U.S. Cl. 156—234         15 Claims

ABSTRACT OF THE DISCLOSURE

A method of adhering or securing metal foil coated with an adhesive bonding agent to a surface of an article which includes pressing the metal foil against the surface with the adhesive in contact with the surface while the foil is at ambient temperature, then causing the metal foil to adhere to the surface by the application of a heat pulse for a short period of time, and then allowing the coated surface to cool while maintaining pressure thereon.

Apparatus for performing the method comprising mechanism for periodically applying the steps to newly inserted articles, and automatic control mechanism for actuating pressing, heating, and timing devices; and for actuating a foil indexing device to move a new area of foil into register with each newly inserted article.

BACKGROUND OF THE INVENTION

(I) Field of the invention

The present invention pertains to an improvement in a method and apparatus for coating surfaces of articles with metal foil, also known as roll leaf stamping or hot leaf stamping.

(II) Description of the prior art

Roll leaf stamping for many years has been used for lettering and decorating book covers and leather goods in gold. (See U.S. Pat. No. 1,406,538, Feb. 14, 1922.)

Roll leaf stamping has involved the use of a stamping press having a continuously heated engraved die of metal or rubber, and a support for the item to be marked. Roll leaf itself generally comprises a thin carrier strip of a plastic material such as Mylar polyethylene terephthalate, cellophane, or acetate which is covered on one side with a very thin vapor deposited coating or foil of metal which is capable of release from the carrier. Such roll leaf material is readily available commercially, for example from Admiral Coated Products, Inc. Adhesion of the foil to a surface is by means of a layer of a thermoplastic bonding agent—usually a powdery material, also called a sizing coat, carried on the side of the foil opposite the Mylar. During the stamping process the item to be marked is positioned on its support, and a strip of roll leaf, coated-side down, passes between the heated die and the item. The heated die is then moved to press the roll leaf against the item, and cause the coating to transfer from the carrier strip. After the coating has been transferred, the heated die is moved away and the carrier strip with any unused part of the metal foil is removed from the marked item.

While the above methods are generally acceptable, I have found that certain problems arise when roll leaf is applied to contoured surfaces or to highlighted portions of flat surfaces. One of the major problems of the prior art is that unless the surface to be covered is uniformly contacted, the coating does not adhere evenly and is not sharply defined. The difficulty of obtaining uniform contact between the die and the surface greatly increases when the surfaces are non-planar.

Non-uniform contact causes the most serious problems in the coating of meltable plastics. With these items, initial contact between the heated die and a high point on the item causes localized melting of the high point. When a plastic item is stamped with a heated pad, the problem of melting is reduced, but the pad has a tendency to wrap the roll leaf around the highlights and thus decrease the sharpness and clarity of the marking. These problems are particularly aggravating when the raised surface areas are of different heights, thicknesses or spacing, as the heated pad will tend to melt the highest and thinnest areas upon contact. Even when the raised surface areas supposedly are of uniform height, the same problems arise because injection molded plastic items may contain warps or distortions which arise from uneven cooling, mold inaccuracies, and variations in molding materials.

SUMMARY OF THE INVENTION

The present invention pertains to a method and apparatus for adhering or securing metal roll leaf (hereinafter called metal foil) to the surface of an article such as a part of a camera case so as to produce a design which is more clear, crisp and sharply defined than has been possible heretofore. The article may be formed of thermoplastic or thermosetting synthetic resin, or of a non-resinous material. However, it is most advantageously applied to a thermoplastic material such as polystyrene which tends to melt at the surface when heat is applied.

The present method comprises intimately contacting the surface of the design to be coated with a layer of foil coated with an adhesive and having the adhesive in contact with the surface, the foil being maintained substantially at a cool ambient temperature before any heat is applied to cause the foil to transfer to the design. Then a short duration pulse of heat is applied to the foil while it is pressed against the article by a smooth metal sheet. The transferred foil coating is then cooled while still under pressure. After cooling any non-adhering foil flash is removed by withdrawing the foil carrier.

Due to the fact that the foil is uniformly pressed against the surface while at a cool ambient temperature, and then is heated above the softening temperature of the adhesive, the method provides substantial increases in the uniformity of coating and permits precise control of the operation. Further, the problem of locally melting the higher portions of an item with non-uniform surfaces is eliminated. Also, when heat is applied, it is more uniformly conducted through the foil into the surface. The more uniform contact during the process makes it possible to eliminate the wrapping of the roll leaf around the edges of raised portions of a highlighted design, and gives a crisp, sharp appearance. This is because the present invention involves the use of substantially uniform pressure by a metal sheet on only the foil which is in contact with the very top of the raised surface. However, when a rounded appearance is desired, the precise control permits slight rounding of the foil at the edges of the design.

According to the present invention, the transferred foil is permitted to cool below the solidification temperature of the adhesive while still being firmly pressed against the surface of the article. This also contributes to the uniformity and clarity of the marking, and assures tight adherence since the transferred coating is able to solidify before the pressure is released.

These and further advantages and features of the invention will appear from the following detailed description, having reference to the accompanying drawings.

BRIEF DESCRIPTION OF THE DRAWINGS

FIG. 1 is a schematic side elevational view, parts being in vertical section, showing apparatus for applying metal foil to an article by the method.

FIG. 2 is a plan view of one type of article having a raised design to receive metal foil.

FIG. 3 is an electrical diagram of an automatic control system for the apparatus of FIG. 1.

DESCRIPTION OF PREFERRED EMBODIMENTS

Referring to FIG. 1, a support nest 11 of a slightly yieldable heat resistant material such as silicone rubber is mounted on a base 13, and in turn carries an article 15 such as a molded plastic camera part having an upwardly raised design 17 upon which metal foil is to be applied.

A long strip 19 of metal foil (roll leaf) is positioned horizontally above the nest 11, with its adhesive coated-side down, and is spaced high enough to permit the insertion and removal of successive articles 15. Strip 19 passes from a supply roll 21 to a driven wind-up roll 23 which is indexed after each actuation of the apparatus to wind up the used portion of the foil flash which escapes application to article 15. Indexing can be accomplished by a suitable hydraulic, pneumatic, or electric motor.

Above the base 13 and the strip 19 there is a vertically reciprocable plunger or shaft 25 having on its lower end a water cooled press head 27 which carries a thin sheet 29 of electrical insulating material such as paper, followed by a thin metal sheet or strip 31 for pressing the foil against the design 17. Sheet 31 advantageously is formed of AISI301 chrome-nickel stainless steel, Nichrome or other high resistance durable metal, and has electrical connections for heating current. Plunger 25 can be reciprocated up and down in a known way, e.g., pneumatically, hydraulically, or by a weight moved by gravity under the damping restraint of a pneumatic piston which is then actuated upwardly by compressed air.

Heater strip or sheet 31 has a block 26 near one end captured in a clamp 28 on the side of head 27. A second block 30 near the opposite end is captured in a second clamp 32 which is spring pressed by a spring 30' about a fulcrum 32' on head 27 so as to take up slack when the strip expands during heating. Suitable insulation is provided to prevent short circuiting when the electrical current enters the strip.

The operation of the apparatus to perform the novel method will be described with reference to FIGS. 1 and 3. Assuming that the plunger 25 is in raised position and an article 15 has been positioned as in FIG. 1, the operator presses a start switch 33 to energize a relay 35 which closes plunger control switch 37 and opens foil-indexing switch 39. Plunger 25 then moves down until heater sheet 31 contacts the top of design 17 uniformly and holds it against the resilient nest 11, at which point a finger 41 on the plunger engages a switch 43 and closes a circuit through relay coils 45 and 47.

Energized relay 47 holds the start switch 33 closed, and comprises a timing mechanism for automatically reopening start switch 33 after a predetermined time interval when the operation has been completed.

Energized relay 45 closes a heater switch 49 controlling the electrical circuit to sheet 31 and causes a pulse of current to heat the sheet rapidly to the temperature needed for foil transfer to cause it to adhere to the top of design 17 under the applied pressure. Relay 45 has a slight time delay built in so as to assure that the sheet 31 is uniformly engaging design 17 before the heating current is started. Concurrently with energization of relay 45, an automatic timing mechanism 51 is energized. Upon expiration of a predetermined time interval, timer 51 opens the circuit through relay 45 and causes switch 49 to open and shut off the heating current. At this time relay 47 is still energized and holding start switch 33 closed.

Meanwhile, cooling water has been continuously flowing through head 27 and withdraws heat from the heater sheet 31, and the article 15 and affixed portion of foil 19. After a predetermined time delay, for proper cooling, the relay 47 opens start switch 33 to deenergize relay 35 and open swtich 37, and plunger 25 moves again to its upper position, opening switch 43 to deenergize relays 45 and 47. It is necessary to delay only long enough for the deposited foil to cool below the temperature at which the adhesive is solid, and at which the melted surface of the plastic article has resolidified. Satisfactory results are possible without water cooling, although a little more time is required. However, the water cooling is essential for quickly cooling the heater strip to ambient before the next operation.

The foil 19 moves up under its own tension, leaving a portion affixed to design 17. When relay 35 is deenergized, foil indexing switch 39 returns to its normally closed position and the indexing mechanism is actuated to roll up the foil flash onto roll 23 and place a new area of foil above design 17.

Then the operator removes the article 15, replaces it with another, and repeats the whole operation by closing start switch 33. For efficient operation, the operator places successive articles on spaced nests carried by a round table which automatically positions them under head 27.

The present method involves the use of force to press the metal foil against the design before the application of heat. In general, the force used must be a large enough to remove any undesired deviation in shape which may have arisen due to many factors, as for example during the molding of plastic parts. The force used must also be sufficient to provide uniformly intimate contact between the raised surface areas and the adhesive coated foil surface, and between the back surface of the foil carrier and the surface of the heater sheet. With items made of meltable plastic it has been found that forces in the range of about 10 to 50 produce successful results. Generally, when the method is carried out at the lower end of the above force range, a greater freedom of temperature control is obtained.

While there are obviously many ways of applying the force required in practicing the present invention, the preferred construction of apparatus uses a variable weight which is constant for any particular item. The weight is lowered by gravity against the damping action of an air cylinder. By using this arrangement a free-floating force is obtained during stamping, and the presshead is returned by the lifting action of the air cylinder. In carrying out the present method, especially on items having variations in their raised surfaces, or slight departures from planar or attitude of the design plane, it is advantageous to use a silicone rubber nest 11 to support the item. This nest aids in achieving more uniform contact by permitting slight movement of the article to match the plane of the raised design with the heater sheet.

While a thin insulating paper layer 29 has been described to back the heater sheet 31, there may additionally be used between the paper and the head a thin layer of resilient material such as silicone rubber to accommodate slight irregularities and still give the appearance of uniformity and flatness, especially when the design is slightly uneven. Also, the bottom or contact surface of th eheater sheet can be coated with a thin layer or silicone rubber when a slightly rounded effect is desired on the design; or the bottom surface can be treated to emboss a design on the deposited metal foil, as by wire brushing or etching a swirled or matte finish into the bottom surface. A textured effect is secured by securing a layer of cloth to the bottom of the strip.

The present method also involves the use of a controlled amount of heat to cause transfer and adherence of the foil, followed by a uniform release of adherent foil from the foil carrier. The minimum temperature is determined by the manufacturer's specifications for a given foil, but is generally about 300° F. at the transfer interface.

Fixed factors affecting the process of the present invention are: (a) electrical resistance of the heater-strip, (b) voltage, and (c) initial temperature of the heater-strip for each cycle. The main controllable variable factor is the duration of the electrical pulse. It is preferred that the temperature of the heater-strip be substantially the same as the cool ambient atmosphere at the start of each cycle. To achieve this, the continuously cooled press head 27 cools the heater-strip during each cycle. The cooling water may be at ambient temperature, or even lower.

The time interval of the electrical pulse is preferably subject to operator control so that adjustments may be made to maintain consistent quality. Once properly set for a given article, no further adjustment should be necessary. In the case of meltable plastic items (e.g., polystyrene, or acrylonitrile-butadiene-styrene copolymer), the time interval should be long enough to allow leveling of any irregular high spots on the raised surfaces by melting under the action of heat and pressure. These irregular spots may be present due to mold irregularities, flash, parting lines, or the like, which arise from the molding process used in making the item. The time interval must not be so long as to cause excessive melting of the raised surface areas themselves, or to cause overflow of the foil and formation of poorly defined edges.

In place of heat timer 51 the control system can include a thermal sensing device which is carried by the silicone nest 11 (outside of the article 15) for engaging the heater strip 31. When a predetermined temperature of the strip is attained, the sensing device opens the circuit through relay 45 to initiate the shut down sequence.

The present method is applied to items of meltable plastic having raised surface areas. The heater-strip is a 5 inch long piece of .0045 inch thick, .75 inch wide stainless steel fastened to the movable press head, under spring tension, and backed up by a thin paper insulator 29. The adhesive surface of the foil is pressed against the article and held for .5 second before heating starts. A three second timer 51 with .01 second increments is used to apply low voltage AC to the heater-strip. With 6.5 volts applied by a standard resistance soldering transformer, satisfactory transfer is accomplished with heating times ranging from .8 to 1.3 seconds. There is then a 0.5 second dwell for cooling before retraction of the heater strip. Then 1 second is allowed for cooling the heater-strip to ambient before commencing another cycle on the next article. A total elapsed time of 4.5 seconds per article is typical.

The invention has been described in detail with particular reference to the preferred embodiments thereof, but it will be understood that variations and modifications can be effected within the spirit and scope of the invention as described hereinabove and as defined in the appended claims.

I claim:

1. A method for adhering metal foil to the surface of an article which comprises pressing onto such a surface a layer of such metal foil carrying a coating of adhesive, with such adhesive in contact with said surface, said layer being at substantially ambient temperature;

heating said layer momentarily while maintaining pressure thereon;

permitting said layer to cool while maintaining pressure thereon; and then removing such pressure.

2. A method in accordance with claim 1 wherein cooling of said layer is achieved by passing a cooling fluid in heat transfer relation therewith.

3. A method in accordance with claim 1 wherein said surface comprises a design of limited area projecting above the rest of said article, and wherein the area of said layer of metal foil is greater than the area of said design, said process also comprising removing excess nonadhering metal foil from said article.

4. A method in accordance with claim 1 wherein said article is resiliently supported so as to permit slight movement thereof while said layer is pressed onto said surface, to compensate for slight variations in said surface.

5. A method in accordance with claim 1 wherein said layer is pressed onto said surface by a metal sheet, wherein said pulse of heat is supplied by passing a pulse of electrical energy through said metal sheet, and wherein said metal sheet is cooled to ambient temperature by passing a cooling fluid in heat transfer relation therewith before a succeeding article is pressed.

6. Apparatus for securing metal foil having an adhesive coating with a predetermined melting temperature to the surface of an article, comprising:

means for positioning an area of metal foil adjacent the surface of an article with the adhesive coating of the metal foil facing the surface;

pressing means movable between an engaged position in which the metal foil is pressed into engagement with the surface, and a disengaged position in which the pressing means is withdrawn from the surface;

means for maintaining said pressing means at substantially ambient temperature when in said disengaged position; and heating means for said pressing means and operative in timed relation to said pressing means for momentarily heating said pressing means to a uniform temperature above the predetermined melting temperature of the adhesive coating when said pressing means is in said engaged position.

7. The invention according to claim 6 wherein said momentary heating of said pressing means varies from substantially .8 second to 1.3 seconds.

8. The invention according to claim 6 wherein said pressing means comprises an electrical conductor.

9. The invention according to claim 6 wherein said pressing means comprises an electrically conducting sheet.

10. The invention according to claim 6 wherein said pressing means comprises an electrically conducting sheet and resilient means coupled to said sheet for maintaining said sheet in a tensioned condition as it expands during heating, and said heating means comprises an electrical power circuit and means for electrically connecting said sheet to said power circuit.

11. The invention according to claim 6 and further including a resilient support for the article to allow the surface of the article to conform to the pressing means.

12. The invention according to claim 6 wherein said temperature maintaining means comprises a heat transfer system for said pressing means.

13. The invention according to claim 6 wherein said temperature maintaining means comprises a chamber defined by said pressing means adjacent said heating means, said chamber having a wall in heat transfer relation to said sheet, and means for passing a cooling fluid through said chamber.

14. The invention according to claim 6 and further including a support for the article, means for indexing a strip of metal foil relative to the article, and means coupling said pressing means to said indexing means to control operation of said pressing and indexing means in timed relation.

15. The invention according to claim 14 wherein said coupling means comprises an electrical circuit.

References Cited

UNITED STATES PATENTS

| | | | |
|---|---|---|---|
| 1,124,869 | 1/1915 | Davis et al. | 156—234X |
| 1,406,538 | 2/1922 | Choate | 156—233 |
| 2,509,439 | 5/1950 | Langer | 156—498 |
| 2,574,094 | 11/1951 | Fener et al. | 156—583 |
| 2,574,095 | 11/1951 | Langer | 156—583 |
| 3,252,847 | 5/1966 | Morgan et al. | 156—240 |
| 3,340,121 | 9/1967 | Lawrenz | 156—234X |
| 3,382,795 | 5/1968 | Downs | 101—9 |
| 3,399,291 | 8/1968 | Limbach | 156—498X |

VERLIN R. PENDEGRASS, Primary Examiner

U.S. Cl. X.R.

156—267, 498